(12) United States Patent
Schroeder et al.

(10) Patent No.: US 10,216,455 B1
(45) Date of Patent: Feb. 26, 2019

(54) SYSTEMS AND METHODS FOR PERFORMING STORAGE LOCATION VIRTUALIZATION

(71) Applicant: Veritas Technologies LLC, Mountain View, CA (US)

(72) Inventors: Ryan Schroeder, Roseville, MN (US); Kirk Searls, Blairsville, GA (US); Aaron Christensen, Apple Valley, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 15/432,614

(22) Filed: Feb. 14, 2017

(51) Int. Cl.
*G06F 3/06* (2006.01)
*G06F 17/30* (2006.01)

(52) U.S. Cl.
CPC .......... *G06F 3/0665* (2013.01); *G06F 3/0608* (2013.01); *G06F 3/0673* (2013.01); *G06F 17/30203* (2013.01)

(58) Field of Classification Search
None
See application file for complete search history.

(56) References Cited

U.S. PATENT DOCUMENTS

| | | | |
|---|---|---|---|
| 9,256,467 B1* | 2/2016 | Singh | G06F 9/5055 |
| 9,367,305 B1 | 6/2016 | Kumar | |
| 9,983,891 B1 | 5/2018 | Christensen | |
| 2004/0148367 A1 | 7/2004 | Takano | |
| 2009/0210869 A1 | 8/2009 | Gebhart | |
| 2011/0047525 A1 | 2/2011 | Castellanos | |
| 2011/0197188 A1 | 8/2011 | Srinivasan | |
| 2014/0181816 A1 | 6/2014 | Muller | |
| 2014/0201374 A1 | 7/2014 | Ashwood-Smith | |
| 2015/0120928 A1 | 4/2015 | Gummaraju | |
| 2015/0269006 A1 | 9/2015 | Caufield | |

(Continued)

OTHER PUBLICATIONS

Preethi Kasireddy, "A Beginner-Friendly Introduction to Containers, VMs and Docker", Mar. 4, 2016.*

(Continued)

*Primary Examiner* — Ryan Bertram
*Assistant Examiner* — Trang K Ta
(74) *Attorney, Agent, or Firm* — FisherBroyles LLP (57) ABSTRACT

The disclosed computer-implemented method for performing storage location virtualization may include (i) identifying a volume storage location for an operating-system-level virtualization container that isolates an instance of user space, the volume storage location providing a working space for data accessed during the existence of the operating-system-level virtualization container, (ii) mapping, through an automated driver that performs location virtualization, the volume storage location to multiple distinct source locations outside of the operating-system-level virtualization container, rather than a single source location, and (iii) propagating, through the automated driver, changes to the data within the working space of the volume storage location during the existence of the operating-system-level virtualization container to the respective multiple distinct source locations outside of the operating-system-level virtualization container to preserve the changes. Various other methods, systems, and computer-readable media are also disclosed.

20 Claims, 4 Drawing Sheets

(56) References Cited

U.S. PATENT DOCUMENTS

| | | | |
|---|---|---|---|
| 2015/0363181 A1 | 12/2015 | Alberti | |
| 2016/0162320 A1 | 6/2016 | Singh | |
| 2016/0378518 A1 | 12/2016 | Antony | |
| 2017/0115977 A1 | 4/2017 | Kim | |
| 2017/0228246 A1 | 8/2017 | Kotha | |
| 2017/0235609 A1* | 8/2017 | Wires | G06F 9/5016 |
| | | | 718/104 |
| 2017/0242617 A1 | 8/2017 | Walsh | |
| 2017/0264684 A1* | 9/2017 | Spillane | H04L 67/1095 |
| 2017/0279797 A1* | 9/2017 | Cross, Jr. | H04L 63/0853 |
| 2017/0322966 A1 | 11/2017 | Tran | |
| 2017/0337054 A1 | 11/2017 | Parees | |
| 2017/0344292 A1* | 11/2017 | Sterin | G06F 3/0619 |
| 2018/0004570 A1 | 1/2018 | Maupu | |

OTHER PUBLICATIONS

Apache Mesos, http://mesos.apache.org, last accessed Jan. 25, 2017.

AWS Lambda, https://aws.amazon.com/lambda/, last accessed Jan. 25, 2017.

Docker container support, last accessed Jan. 25, 2017.

Dray—Docker Workflow Engine, http://dray.it/, last accessed Jan. 25, 2017.

Docker ETL Rest server github, https://github.com/bmamlin/docker-etl-rest-server, last accessed Jan. 25, 2017.

Docker Nifi github, https://github.com/jdye64/docker-nifi, last accessed Jan. 25, 2017.

Mesos/Chronos github, https://github.com/mesos/chronos, last accessed Jan. 25, 2017.

Apache Nifi for Docker, https://github.com/apiri/dockerfile-apache-nifi, last accessed Jan. 25, 2017.

Coho Data, https://www.cohodata.com/intel, last accessed Jan. 25, 2017.

Iron.io, https://www.iron.io/, last accessed Jan. 25, 2017.

Jenkins and Docker, https://www.cloudbees.com/continuous-delivery/jenkins-docker, last accessed Jan. 25, 2017.

Pachyderm.io, https://www.pachyderm.io/, last accessed Jan. 25, 2017.

Syncsort ETL, last accessed Jan. 25, 2017.

Talend and Docker, last accessed Jan. 25, 2017.

What is Docker?, https://www.docker.com/what-docker, last accessed Jan. 25, 2017.

Docker Swarm product overview, https://www.docker.com/products/docker-swarm, last accessed Feb. 28, 2017.

Kubernetes Basics, https://kubernetes.io/docs/tutorials/kubernetes-basics/, last accessed Feb. 28, 2017.

Attach a volume to a container while it is running; http://jpetazzo.github.io/2015/01/13/docker-mount-dynamic-volumes/, as accessed Feb. 23, 2017 (Jan. 13, 2015); Github.

Manage data in containers; https://docs.docker.com/engine/tutorials/dockervolumes/#/backup-restore-or-migrate-data-volumes, as accessed Feb. 23, 2017 (Sep. 3, 2016); Docker.

Docker—Data volumes and Data Containers (4); http://www.tricksofthetrades.net/2016/03/14/docker-data-volumes/, as accessed Feb. 23, 2017 (Mar. 14, 2016); Tricks of the Trades.

Understanding volumes in Docker; http://container-solutions.com/understanding-volumes-docker/, as accessed Feb. 23, 2017 (Jul. 6, 2015); Container Solutions Amsterdam.

Docker mounting volumes on host; http://stackoverflow.com/questions/25311613/docker-mounting-volumes-on-host, as accessed Feb. 23, 2017 (Aug. 14, 2014); stackoverflow.

Understand images, containers, and storage drivers; https://docs.docker.com/engine/userguide/storagedriver/imagesandcontainers/, as accessed Feb. 23, 2017 (Nov. 7, 2015); Docker.

A Not Very Short Introduction to Docker; https://blog.jayway.com/2015/03/21/a-not-very-short-introduction-to-docker/, as accessed Feb. 23, 2017 (Mar. 21, 2015); jayway.

Use data volume containers; https://getcarina.com/docs/tutorials/data-volume-containers/, as accessed Feb. 23, 2017 (Oct. 23, 2015); Rackspace.

What is the differences between Data Scientist Workbench and Knowledge Anyhow Workbench; http://support.datascientistworkbench.com/knowledgebase/articles/738753-what-is-the-differences-between-data-scientist-wor, as accessed Feb. 14, 2017 (Jan. 13, 2016); Big Data University.

Rodeo Basics; http://rodeo.yhat.com/docs/, as accessed Feb. 14, 2017 (Nov. 14, 2015); Rodeo.

Extract, transform, load; https://en.wikipedia.org/wiki/Extract,_transform,_load, as accessed Feb. 14, 2017 (Aug. 15, 2004); Wikipedia.

What is Docker; http://searchitoperations.techtarget.com/definition/Docker; as accessed Jan. 28, 2017.

Platform as a Service; https://en.wikipedia.org/wiki/Platform_as_a_service; as accessed Jan. 28, 2017.

What is Scale out Storage; http://whatis.techtarget.com/definition/scale-out-storage; as accessed Jan. 28, 2017.

Real-Time Data Analysis with Kubernetes, Redis, and BigQuery; https://cloud.google.com/solutions/real-time/kubernetes-redis-bigquery; as accessed Jan. 28, 2017.

Operating-system-level virtualization; https://en.wikipedia.org/wiki/Operating-system-level_virtualization; as accessed Jan. 28, 2017.

Advanced Analytics Products; http://www.sas.com/en_us/software/analytics.html#view-all-products; as accessed Jan. 31, 2017.

Containerized Cloud Analytics—SAS Analytics for Containers; http://www.sas.com/en_us/software/analytics-for-containers.html; as accessed Jan. 31, 2017.

Container Cluster; https://cloud.google.com/container-engine/docs/clusters/#what_is_a_container_cluster; as accessed Jan. 31, 2017.

Object Storage; https://en.wikipedia.org/wiki/Object_storage; as accessed Jan. 30, 2017.

Clustered file system; https://en.wikipedia.org/wiki/Clustered_file_system; as accessed Jan. 30, 2017.

Ryan Schroeder et al.; Systems and Methods for Automatically Linking Data Analytics to Storage; U.S. Appl. No. 15/428,134, filed Feb. 8, 2017.

Wikipedia; Operating-system-level virtualization; https://en.wikipedia.org/wiki/Operating-system-level_virtualization, as accessed on Feb. 14, 2017.

plugins_volume.md; https://github.com/docker/docker/blob/master/docs/extend/plugins_volume.md, as accessed on Feb. 14, 2017.

Ryan Schroeder et al.; Systems and Methods for Performing Storage Location Virtualization; U.S. Appl. No. 15/432,614, filed Feb. 14, 2017.

Kirk Searls et al.; Systems and Methods for Building an Extract, Transform, Load Pipeline; U.S. Appl. No. 15/431,971, filed Feb. 14, 2017.

\* cited by examiner

SYSTEMS AND METHODS FOR PERFORMING STORAGE LOCATION VIRTUALIZATION

BACKGROUND

Operating-system-level virtualization containers can be useful for processing data in a manner that protects or isolates the data from external influences. Nevertheless, a conventional virtualization container may only permit one-to-one mappings with a local directory or file that is external to the virtualization container.

Additionally, when running a conventional virtualization container within a cluster or scaling environment (such as DOCKER SWARM or KUBERNETES), challenges may arise in the process of providing storage to these containers, because a particular container may run on any of the nodes within the cluster. This cluster configuration can introduce complications when mapping storage locations to varying nodes of the cluster where virtualization containers are configured. Users may attempt to address these challenges by using object stores, network file system mounts, or distributed file systems. Nevertheless, these conventional solutions may still face the challenge of selecting, combining, and securing multiple sources of data, as discussed further below. For example, a user may find it inconvenient, or inefficient, to access data from multiple distinct external sources within a conventional virtualization container. The instant disclosure, therefore, identifies and addresses a need for systems and methods for performing storage location virtualization.

SUMMARY

As will be described in greater detail below, the instant disclosure describes various systems and methods for performing storage location virtualization. In one example, a computer-implemented method for performing storage location virtualization may include (i) identifying a volume storage location for an operating-system-level virtualization container that isolates an instance of user space, the volume storage location providing a working space for data accessed during the existence of the operating-system-level virtualization container, (ii) mapping, through an automated driver that performs location virtualization, the volume storage location to multiple distinct source locations outside of the operating-system-level virtualization container, rather than a single source location, such that contents from the multiple distinct source locations appear within the volume storage location as a combined single location for the contents, and (iii) propagating, through the automated driver, changes to the data within the working space of the volume storage location during the existence of the operating-system-level virtualization container to the respective multiple distinct source locations outside of the operating-system-level virtualization container to preserve the changes.

In one embodiment, the operating-system-level virtualization container operates in a cluster environment and the automated driver provides access to the volume storage location to multiple operating-system-level virtualization containers on distinct nodes across the cluster environment. In additional embodiments, the automated driver further virtualizes the virtual storage location within the cluster environment such that the virtual storage location is available to each node of the cluster environment regardless of which node issues an access request to the virtual storage location.

In some examples, identifying the volume storage location may include receiving a name for the volume storage location and saving the name for the volume storage location to enable repeated reference to the volume storage location. In one embodiment, a file within one of the multiple distinct source locations is categorized as sensitive and the automated driver blocks access, from the operating-system-level virtualization container, to the sensitive file.

In one embodiment, mapping, through the automated driver that performs location virtualization, the volume storage location to multiple distinct source locations outside of the operating-system-level virtualization container may include initially receiving a selection from a user of the multiple distinct source locations as sources for the volume storage location. In additional embodiments, one of the multiple distinct source locations outside of the operating-system-level virtualization container includes a mountable network file system and the automated driver is configured to mount the mountable network file system to propagate at least one of the changes to the data within the working space of the volume storage location during the existence of the operating-system-level virtualization container to the mountable network file system.

In one embodiment, one of the multiple distinct source locations outside of the operating-system-level virtualization container includes a scalable redundant storage system instance and the automated driver is configured to access the scalable redundant storage system instance through a corresponding application programming interface. In some examples, identifying the volume storage location enables usage of the volume storage location to be repeatable such that a user can provide access to the volume storage location from within a different operating-system-level virtualization container without the user repeatedly identifying the multiple distinct source locations. In additional embodiments, the automated driver operates at a kernel level of a corresponding operating system.

In one embodiment, a system for implementing the above-described method may include (i) an identification module, stored in memory, that identifies a volume storage location for an operating-system-level virtualization container that isolates an instance of user space, the volume storage location providing a working space for data accessed during the existence of the operating-system-level virtualization container, (ii) a mapping module, stored in memory, that maps, through an automated driver that performs location virtualization, the volume storage location to multiple distinct source locations outside of the operating-system-level virtualization container, rather than a single source location, such that contents from the multiple distinct source locations appear within the volume storage location as a combined single location for the contents, (iii) a propagation module, stored in memory, that propagates, through the automated driver, changes to the data within the working space of the volume storage location during the existence of the operating-system-level virtualization container to the respective multiple distinct source locations outside of the operating-system-level virtualization container to preserve the changes, and (iv) at least one physical processor configured to execute the identification module, the mapping module, and the propagation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a volume storage location for an operating-system-level virtualization container that isolates an instance of user space, the volume storage location providing a working space for data accessed during the existence of the operating-system-level virtualization container, (ii) map, through an automated driver that performs location virtualization, the volume storage location to multiple distinct source locations outside of the operating-system-level virtualization container, rather than a single source location, such that contents from the multiple distinct source locations appear within the volume storage location as a combined single location for the contents, and (iii) propagate, through the automated driver, changes to the data within the working space of the volume storage location during the existence of the operating-system-level virtualization container to the respective multiple distinct source locations outside of the operating-system-level virtualization container to preserve the changes.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for performing storage location virtualization. The systems and methods may generally improve upon related or conventional systems that provide one-to-one mapping between an operating-system-level virtualization container and an external folder or file. For example, in the case of a DOCKER container, the DOCKER container may provide a "volume," which is a folder or location that maps to a single underlying folder or file on the external system where the DOCKER container is executing. Nevertheless, in these conventional systems, the DOCKER container may be unable to conveniently map the volume to multiple distinct sources on the external system. Additionally, the DOCKER system may not possess the intelligence or sophistication to mount a mountable storage source in order to access the storage source, provide access credentials to access a storage source, and/or block or prohibit access to sensitive or confidential storage sources. Accordingly, the disclosed systems and methods may provide a volume storage location, which is analogous to a "volume" in a DOCKER system, but which provides more robust and dynamic functionality that can seamlessly combine multiple distinct storage locations, while also optionally having the intelligence and sophistication to mount, login to, interface with, and/or selectively protect varying external data sources, as discussed further below.

Figure 1:
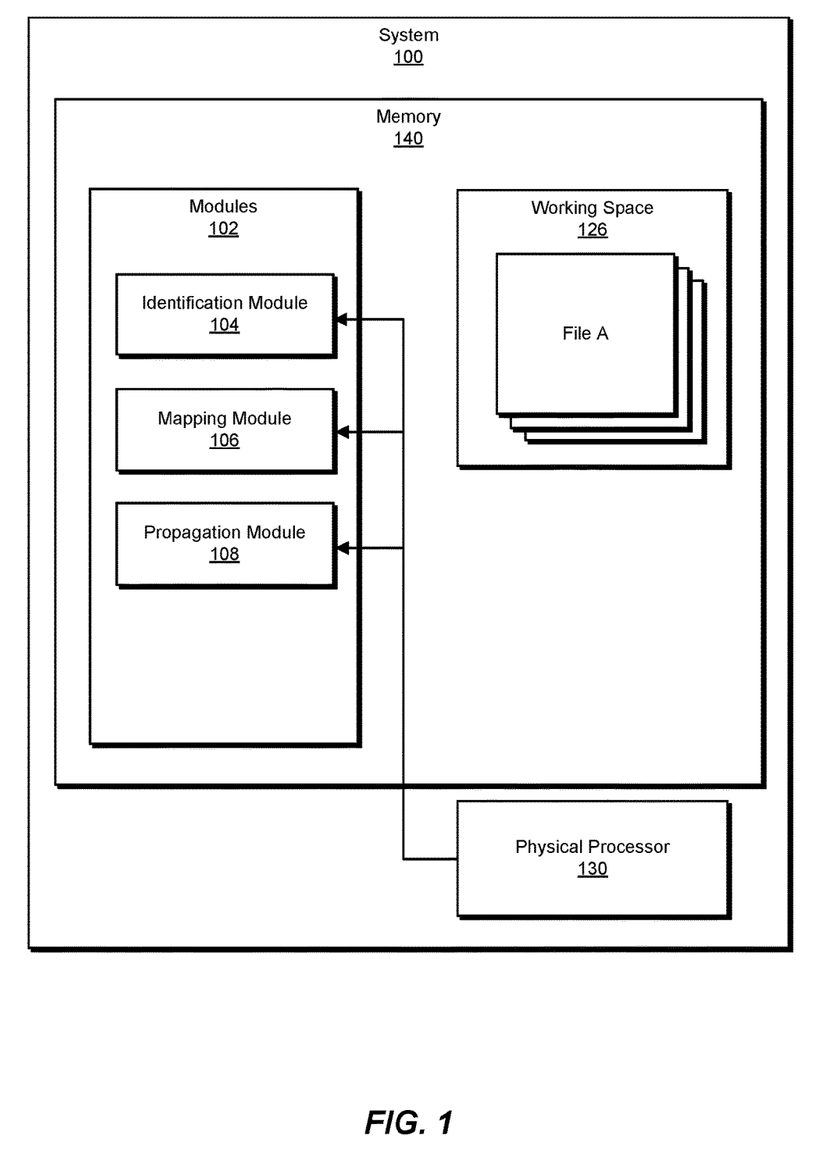
FIG. 1 is a block diagram of an example system for performing storage location virtualization.
Figure 2:
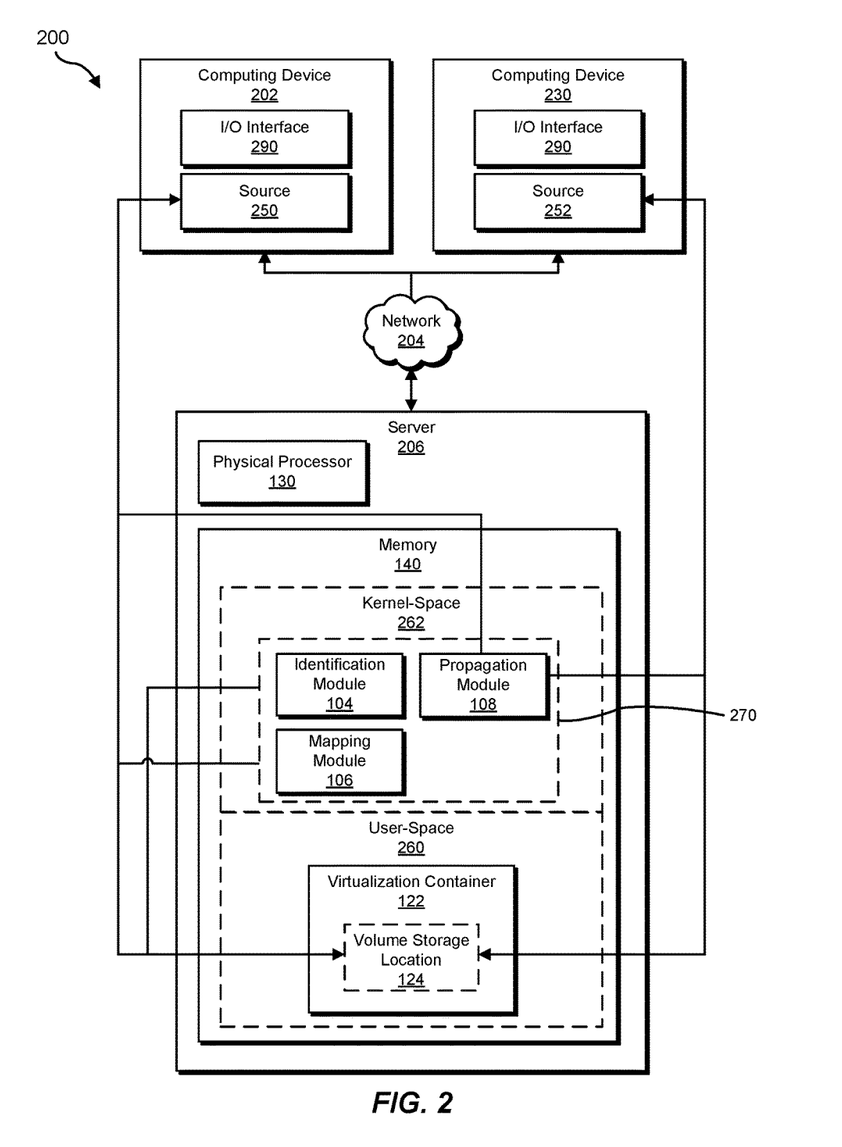
FIG. 2 is a block diagram of an additional example system for performing storage location virtualization.

The following will provide, with reference to FIGS. 1-2, detailed descriptions of example systems for performing storage location virtualization. Detailed descriptions of corresponding computer-implemented methods will also be provided in connection with FIGS. 3-4.

FIG. 1 is a block diagram of example system 100 for performing storage location virtualization. As illustrated in this figure, example system 100 may include one or more modules 102 for performing one or more tasks. For example, and as will be explained in greater detail below, example system 100 may include an identification module 104 that identifies a volume storage location for an operating-system-level virtualization container that isolates an instance of user space. The volume storage location may provide a working space for data accessed during the existence of the operating-system-level virtualization container. Example system 100 may additionally include a mapping module 106 that maps, through an automated driver that performs location virtualization, the volume storage location to multiple distinct source locations outside of the operating-system-level virtualization container, rather than a single source location, such that contents from the multiple distinct source locations appear within the volume storage location as a combined single location for the contents. Example system 100 may also include a propagation module 108 that propagates, through the automated driver, changes to the data within the working space of the volume storage location during the existence of the operating-system-level virtualization container to the respective multiple distinct source locations outside of the operating-system-level virtualization container to preserve the changes. Although illustrated as separate elements, one or more of modules 102 in FIG. 1 may represent portions of a single module or application.

As further shown in FIG. 1, memory 140 may also include a working space 126, which may further include a collection of files (e.g., such as the "File A" shown in the figure). Working space 126 may correspond to the storage space at the volume storage location, as discussed further below.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate performing storage location virtualization. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102, and any permutation thereof, may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to perform storage location virtualization.

Computing device 202 generally represents any type or form of computing device capable of reading computer-executable instructions. In some examples, computing device 202 may correspond to a node of a cluster computing environment. For example, computing device 202 may correspond to a node of a DOCKER SWARM or KUBERNETES cluster computing environment. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Notably, FIG. 2 also shows another computing device 230, which may have a parallel configuration to computing device 202. Computing device 230 may also correspond to another node of the cluster computing environment. Additionally, both computing device 202 and computing device 230 may include a parallel I/O interface 290, which may provide an interface for communicating with the user at a corresponding cluster node.

In the example of FIG. 2, identification module 104 may identify a volume storage location 124 for an operating-system-level virtualization container 122 that isolates an instance of user space. Volume storage location 124 may provide working space 126 for data accessed during the existence of virtualization container 122. Additionally, mapping module 106 may map, through an automated driver 270 that performs location virtualization, volume storage location 124 to multiple distinct source locations, such as a source 250 (within computing device 202) and a source 252 (within computing device 230), which are located outside of virtualization container 122, rather than a single source location. Mapping module 106 may perform the mapping such that contents from the multiple distinct source locations appear within volume storage location 124 as a combined single location for the contents, as discussed further below in connection with FIG. 4. Furthermore, propagation module 108 may propagate, through automated driver 270, changes to the data within working space 126 of volume storage location 124 during the existence of virtualization container 122 to the respective multiple distinct source locations outside of virtualization container 122 to preserve the changes.

Additionally, as shown in FIG. 2, identification module 104, mapping module 106, and propagation module 108 may be located within a kernel-space 262 of memory 140. Conversely, virtualization container 122, and volume storage location 124, may be located within a user-space 260 of memory 140, as discussed further below. Accordingly, in one embodiment, automated driver 270 operates at a kernel level of a corresponding operating system of server 206.

Server 206 generally represents any type or form of computing device that is capable of facilitating or performing method 300, as discussed further below. In some examples, server 206 may correspond to another node of the cluster computing environment. In other examples, server 206 may correspond to a server or other computing device that manages or facilitates the cluster computing environment. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
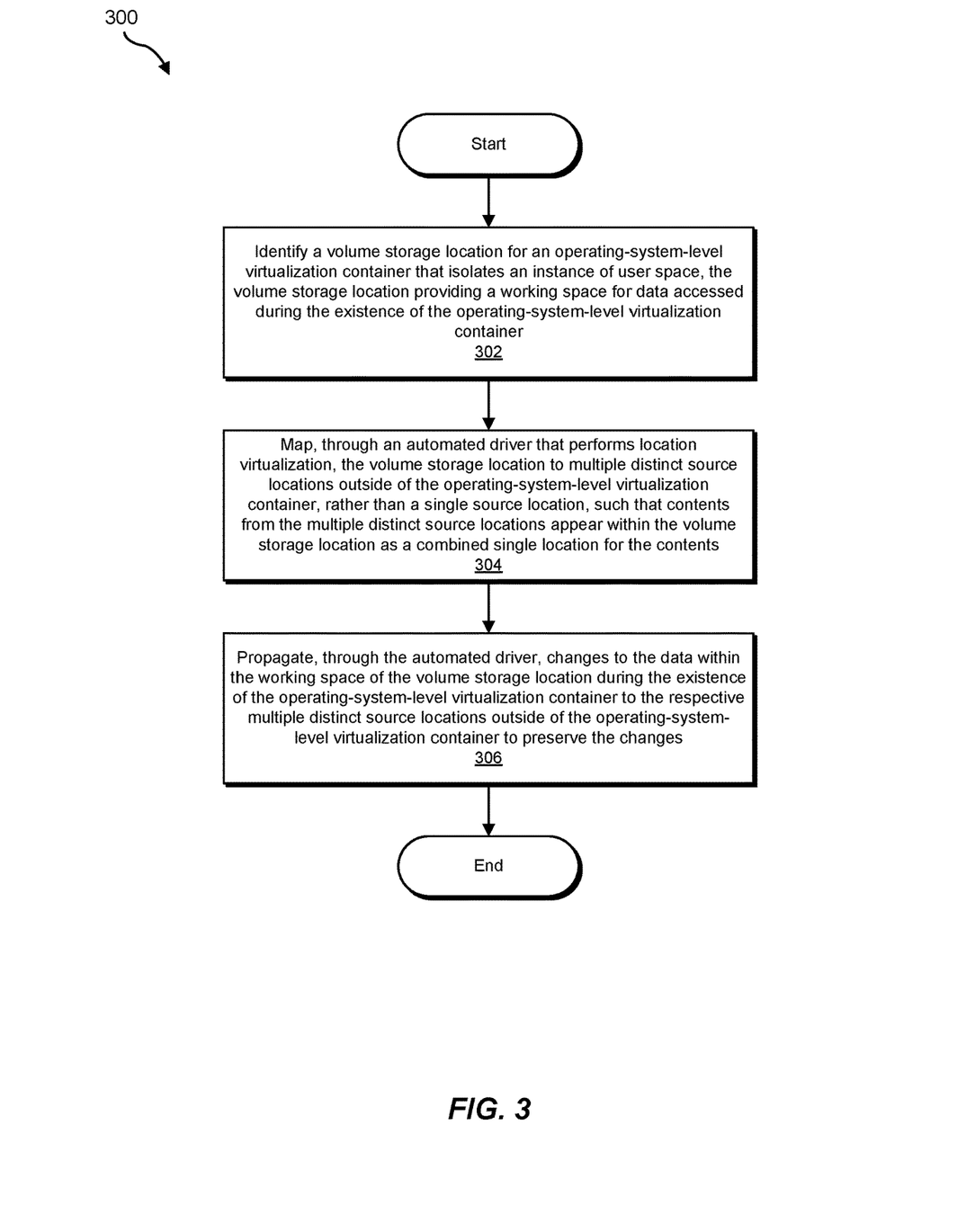
FIG. 3 is a flow diagram of an example method for performing storage location virtualization.

FIG. 3 is a flow diagram of an example computer-implemented method 300 for performing storage location virtualization. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a volume storage location for an operating-system-level virtualization container that isolates an instance of user space. For example, identification module 104 may, as part of server 206 in FIG. 2, identify volume storage location 124 for virtualization container 122 that isolates an instance of user space.

As used herein, the terms "operating-system-level virtualization container" or "virtualization" generally refer to a server virtualization method in which the kernel of an operating system allows the existence of multiple isolated user-space instances (e.g., within system memory or virtual memory,) instead of just one. Furthermore, the term "user-space" generally refers to the portion of system memory or virtual memory that corresponds to user data or application data, as distinct from the kernel-space. In some examples, these instances of user-space may be referred to as "containers," "software containers," "virtualization engines," or "jails," (such as FREEBSD or CHROOT jails). These containers may generally appear to be, and function substantially the same as, an actual or non-virtualized server from the perspective of a user, owner, or caller. In the example of UNIX-type systems, this technology can correspond to an advanced implementation of the standard CHROOT mechanism. In addition to isolation mechanisms, the kernel often optionally provides resource-management features to limit the impact of one container's activities on other containers. Illustrative examples of implementations for these virtualization containers may include CHROOT, DOCKER, LINUX VSERVER, LMCTFY, LXC, LXD, OPENVZ, VIRTUOZZO, SOLARIS CONTAINERS, FREEBSD JAIL, SYSJAIL, WPARS, HP-UX CONTAINERS, ICORE VIRTUAL ACCOUNTS, SANDBOXIE, SPOON, and/or VMWARE THINAPP.

Furthermore, as used herein, the term "volume storage location" generally refers to a location within the virtualization container where a user may store data to enable its preservation external to the virtualization container, or after expiration of the virtualization container (e.g., because virtualization containers may be transient). For example, the volume storage location may enable the user to immediately, continuously, and/or in a synchronized manner propagate changes to the data within the volume storage location to a corresponding external location, as discussed further below. As one illustrative embodiment, the volume storage location may correspond to a "volume," as that term is used in reference to DOCKER virtualization technology. Additionally, as used herein, the term "working space" generally refers to space at the virtual storage location that may store data to enable its preservation external to the virtualization container, or after expiration of the virtualization container, as discussed further below.

Identification module 104 may identify the volume storage location in a variety of ways. In some examples, creation of the virtualization container may inherently, impliedly, and/or automatically create a corresponding volume storage location. The volume source location may provide a location, and corresponding storage space, where the user can store data to enable its preservation external to the virtualization container, as further discussed above. In other examples, identification module 104 may identify the volume storage location in response to a user command that creates the volume storage location.

In general, identification module 104 may identify the volume storage location by receiving a name for the volume storage location and saving the name for the volume storage location to enable repeated reference to the volume storage location. For example, identification module 104 may identify the volume storage location in part by prompting a user for a name for the volume storage location and/or receiving the name for the volume storage location. In specific examples, the name may correspond to any arbitrary alphanumeric string, or other string or symbol, that the user may use to identify and reference the volume storage location. In other words, identification module 104 may, in response to user input, effectively label a list or data structure that identifies the multiple distinct storage locations to be mapped to the volume storage location.

At step 304, one or more of the systems described herein may map, through an automated driver that performs location virtualization, the volume storage location to multiple distinct source locations outside of the operating-system-level virtualization container, rather than a single source location, such that contents from the multiple distinct source locations appear within the volume storage location as a combined single location for the contents. For example, mapping module 106 may, as part of server 206 in FIG. 2, map, through automated driver 270 that performs location virtualization, volume storage location 124 to source 250 and source 252 outside of virtualization container 122, rather than a single source location.

As used herein, the term "automated driver" refers to a system, background, kernel-level, and/or operating system-level process or software component that translates locations within the volume storage location to corresponding, or respective, locations across the multiple distinct source locations, such as source 250 and source 252, thereby performing storage location virtualization in accordance with method 300, as discussed further below. Additionally, the term "outside of the operating-system-level virtualization container" generally refers to storage space or locations that are external to the isolated user-space of the virtualization container within the same cluster node or computing device, or located on an entirely separate computing device or network device, as discussed further below. Furthermore, as used herein, the term "location virtualization," generally refers to a virtualization process that translates one storage space location into another storage space location to route or redirect a corresponding data access request.

Mapping module 106 may map the volume storage location to the multiple distinct source locations in a variety of ways. In general, mapping module 106 may receive user input that identifies the multiple distinct source locations as respective points from which to extract or propagate data. For example, mapping module 106 may receive user input that identifies a specific folder or directory to be included within the volume storage location. In these examples, mapping module 106 may map the specific folder or directory to the volume storage location such that contents of the folder or directory are copied, or propagated, into the volume storage location when the user accesses the volume storage location within the virtualization container. In a parallel manner, mapping module 106 may map a specific file to the volume storage location such that the file is copied, or propagated, into the volume storage location. The user may select a specific location, point, file, folder, directory, subdirectory, volume, partition, drive, network, or other storage location, through any suitable user interface, such as clicking within a graphical user interface on an icon or graphic that designates the location, or by entering suitable text within a command line interface. For example, the user may type a list of different storage locations.

In one embodiment, the operating-system-level virtualization container operates in a cluster environment. For example, identification module 104, as part of server 206, may identify the volume storage location as corresponding to virtualization container 122, within an overall cluster environment that includes computing device 202, computing device 230, and server 206. In these examples, any permutation of computing device 202, computing device 230, and server 206 may correspond to nodes of the cluster environment. Additionally, in these examples, the automated driver may provide access to the volume storage location to multiple operating-system-level virtualization containers on distinct nodes across the cluster environment. For example, automated driver 270 may provide access to volume storage location 124 to both virtualization container 122 at server 206 and also to another virtualization container, which may be located at computing device 202 or computing device 230.

In one embodiment, the automated driver further virtualizes the virtual storage location within the cluster environment such that the virtual storage location is available to each node of the cluster environment regardless of which node issues an access request to the virtual storage location. In other words, a virtualization container at any one of computing device 202, computing device 230, and server 206 may successfully access volume storage location 124, such that read/write operations from each respective virtualization container may be formatted in the same manner, server 206 (e.g., a centralized management server of the corresponding cluster environment) may automatically route these operations to automated driver 270, and the automated driver may translate these read/write operations such that they are selectively directed or redirected to the correct and actual stored location (e.g., source 250 and source 252), as discussed further below.

Figure 4:
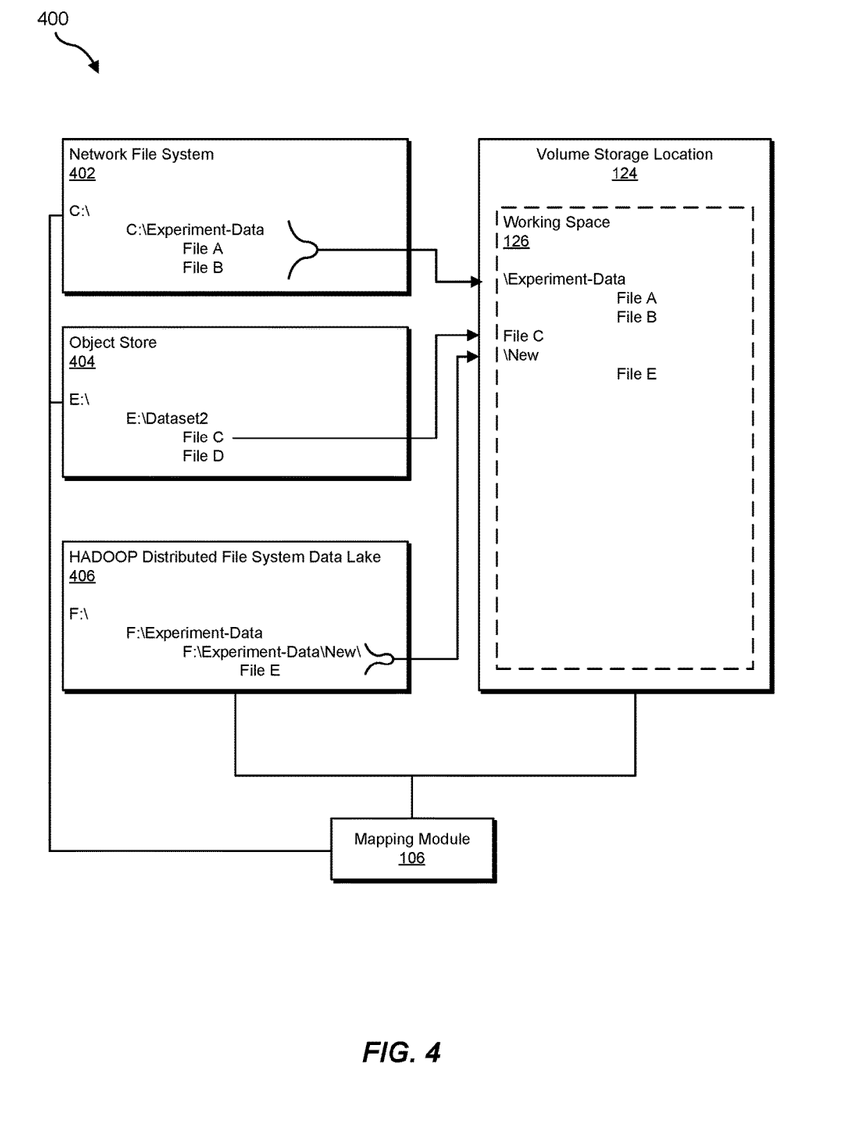
FIG. 4 is a block diagram of an example mapping between multiple distinct source locations and a volume storage location in accordance with the disclosed systems and methods for performing storage location virtualization.

In one embodiment, mapping module 106 may map, through the automated driver that performs location virtualization, the volume storage location to multiple distinct source locations outside of the operating-system-level virtualization container by initially receiving a selection from a user of the multiple distinct source locations as sources for the volume storage location. FIG. 4 illustrates an example 400 of multiple distinct source locations (i.e., a network file system 402, an object store 404, and a HADOOP distributed file system data lake 406). These multiple distinct source locations may be located at any permutation of computing device 202, computing device 230, and server 206. In general, the multiple distinct source locations may be external to virtualization container 122, thereby providing a more persistent storage location for data that is accessed or processed within virtualization container 122. As further shown in this figure, example 400 may further include volume storage location 124 and corresponding working space 126. In other words, working space 126 may correspond to a graphical user interface display of the storage space located at volume storage location 124.

In the example of FIG. 4, mapping module 106 may map one or more files, directories, folders, or locations to volume storage location 124, thereby enabling data that is accessed or processed within working space 126 to be stored or saved more persistently within the multiple distinct source locations, respectively. In this specific example, a user has mapped a directory (i.e., "C:\Experiment-Data") at network file system 402 to volume storage location 124. Similarly, the user has mapped a specific file (i.e., "file C") at object store 404 to volume storage location 124. Additionally, the user has mapped a specific sub-directory (i.e., "F:\Experiment-Data\New\") at HADOOP distributed file system data lake 406 to volume storage location 124.

In view of the above, mapping module 106 has automatically propagated these contents into working space 126 (e.g., at the creation of volume storage location 124, and prior to any further changes to the contents). In general, the automated driver may continuously, systematically, and/or periodically synchronize content between the designated multiple distinct source locations and the volume source location. In some examples, the automated driver (e.g., propagation module 108) may propagate changes in both directions (e.g., from the multiple distinct source locations to the volume storage location, and vice versa). In other examples, one or more of the multiple distinct source locations may be read-only and/or the automated driver may only propagate changes in one direction (e.g., from the volume storage location to the multiple distinct source locations).

As further shown in FIG. 4, mapping module 106 may effectively lose, or collapse, higher-level hierarchical information at the multiple distinct source locations when copying or propagating data into the volume storage location. For example, working space 126 does not show the parent directory "F:\Experiment-Data\" that is located within HADOOP distributed file system data lake 406. Similarly, mapping module 106 may optionally preserve lower-level hierarchical information by preserving sub-directory or sub-folder information, and structure, that is below a location or directory that the user mapped to the volume storage location. Accordingly, within working space 126, as shown in FIG. 4, all of the "Experiment-Data" directory, File C, and the "New" sub-directory appear to be relocated to a same level, parent location, directory, or folder, which corresponds to volume storage location 124.

In one embodiment, a file within one of the multiple distinct source locations is categorized as sensitive and the automated driver blocks access, from the operating-system-level virtualization container, to the sensitive file. In the example of FIG. 4, the user may select both file C and file D, within object store 404, to be included within working space 126. Nevertheless, file D may be categorized or labeled as sensitive within the cluster computing environment according to a security policy. Consequently, the automated driver (e.g., mapping module 106) may prevent file D from being synchronized with volume storage location 124, or otherwise included within working space 126.

In one embodiment, one of the multiple distinct source locations outside of the operating-system-level virtualization container includes a mountable network file system and the automated driver is configured to mount the mountable network file system to propagate at least one of the changes to the data within the working space of the volume storage location during the existence of the operating-system-level virtualization container to the mountable network file system. For example, network file system 402 may be mountable. Accordingly, the automated driver may be configured to automatically mount network file system 402 to initially map the directory from network file system 402 to volume storage location 124, to copy or propagate content from the mapped directory to volume storage location 124, and/or to copy or propagate changes to the directory back into network file system 402, as discussed further below in connection with step 306.

In one embodiment, one of the multiple distinct source locations outside of the operating-system-level virtualization container includes a scalable redundant storage system instance and the automated driver is configured to access the scalable redundant storage system instance through a corresponding application programming interface. For example, object store 404 may correspond to a SWIFT object store. SWIFT technology may provide a corresponding application programming interface for communicating with the SWIFT object store (i.e., the REST API). Accordingly, mapping module 106 may be configured to access object store 404 through the REST API. Similarly, mapping module 106, and the automated driver more generally, may be configured to intelligently mount, provide credentials for, or otherwise login to multiple distinct storage locations in order to perform steps 304 and/or 306, respectively.

In some examples, identification module 104 may enable usage of the volume storage location to be repeatable such that a user can provide access to the volume storage location from within a different operating-system-level virtualization container without the user repeatedly identifying the multiple distinct source locations. In the example of FIG. 4, a user may initially select the multiple distinct storage locations to map them to volume storage location 124 for virtualization container 122 within server 206. Subsequently, the user may pause, delete, or clean virtualization container 122. Later, the user may desire to reference the same specific set of multiple distinct storage locations at a different node of the cluster environment (e.g., computing device 202), or from within a different instance of a virtualization container. Accordingly, instead of repeating the process of manually selecting, or otherwise selecting, the multiple distinct storage locations, the user may simply reference the name, label, tag, or identifier that was previously assigned to the virtual storage location. Accordingly, the user may quickly and conveniently reference the same specific set of multiple distinct storage locations without repeating a tedious manual selection process.

Returning to step 306, one or more of the systems described herein may propagate, through the automated driver, changes to the data within the working space of the volume storage location during the existence of the operating-system-level virtualization container to the respective multiple distinct source locations outside of the operating-system-level virtualization container to preserve the changes. For example, propagation module 108 may, as part of server 206 in FIG. 2, propagate, through the automated driver, changes to the data within working space 126 of volume storage location 124 during the existence of virtualization container 122 to source 250 and source 252 outside of virtualization container 122 to preserve the changes.

Notably, in connection with step 306, the phrase "during the existence of the operation-system-level virtualization container" generally refers to the timing of the user making the changes, rather than the timing of propagating the changes. As discussed further above, propagation module 108 may propagate the changes according to any suitable schedule that achieves the intended benefits of method 300, including propagation that is continuous, synchronized, and/or periodic. Additionally, as used herein, the term "user" generally refers to any human, software component, hardware component, or other agent that may interface with identification module 104 to effect the performance of method 300.

Propagation module 108 may propagate the changes to content within working space 126 in a variety of ways. In general, whenever a user makes a change to data located at volume storage location 124, from within virtualization container 122, propagation module 108 may immediately, automatically, or in response, copy or propagate the change to the respective underlying data source. In some examples, propagation module 108 may propagate the change directly by modifying the underlying, external data without creating or modifying any file system copy of the data. For example, if the user modifies file C within virtualization container 122, then propagation module 108 may propagate the change to file C within object store 404, which is the respective data source for file C. Similarly, if the user modifies the name or content of the "Experiment-Data" directory within virtualization container 122, then propagation module 108 may propagate the change(s) to the "C:\Experiment-Data" directory within network file system 402, which is the respective data source for that directory, as shown in FIG. 4. By propagating the changes to respective underlying data sources that provide persistent saving and storage for the changed data, propagation module 108 may effectively protect the changed data from potential loss or tampering due to the transient nature of the corresponding virtualization container.

The above discussion provides an overview of method 300, as shown in FIG. 3. Additionally, the following discussion provides a more detailed overview of concrete embodiments of the disclosed systems and methods. In this discussion, steps or features of the disclosed systems and methods may be performed by any one or more of modules 102, in any suitable manner that is consistent with method 300.

DOCKER volumes can be useful, but they only allow for simple one-to-one mappings with a local directory or file. When running DOCKER containers in a scale-out setting (such as DOCKER SWARM or KUBERNETES), it can become challenging to make storage available to the containers, because a particular container may run on any of the nodes in the cluster. This challenge can potentially be solved with solutions like object stores, network file system mounts, or distributed file systems like HADOOP DISTRIBUTED FILE SYSTEM (HDFS).

Even when using these solutions, there is still the challenge of sub-setting (e.g., identifying subsets), combining, and securing the data. For example, a user, perhaps an analyst using DOCKER containers on KUBERNETES to run an experiment, may want to combine data from two sources (e.g., a SWIFT object store and an HDFS data lake). The analyst may only want three files from the data lake and one "directory" from SWIFT (object stores may optionally have a quasi-folder mechanism that effectively functions as file system folders). Also, some of the files on the HDFS storage may be sensitive, and the analyst should not have access to them according to a pre-established security policy. One solution would be to have a special DOCKER volume that virtualizes access to just the files that the analyst wants. The specialized volume may optionally be available to all containers the analyst runs on the cluster, regardless of the node on which a particular container is executed.

Another challenge associated with conventional solutions is finding a way to repeat this process. After the containers and volumes have been cleaned up, the user may want to reuse the same collection of data for a new batch of containers. Accordingly, it would be convenient if the user was not prompted to re-select which files the user wants to have on this virtualized volume for subsequent executions of virtualization containers.

One important feature of the disclosed systems and methods is the ability to select and save a workspace containing a subset of files sourced from multiple data sources (for example, scale-out friendly sources), and the ability to provision and access that workspace as a virtualization container volume (e.g. specialized DOCKER volume) across a cluster such as SWARM or KUBERNETES.

The disclosed systems and methods may include a FILE-SYSTEM IN USERSPACE module or kernel module for creating a virtualized file system. This module may be configured as a virtualization container driver. The disclosed systems and methods may also include a tool for creating virtualization container volumes (e.g., specialized DOCKER volumes) that use this driver across a cluster when a user requests it. Lastly, the disclosed systems and methods may include a tool for saving metadata about which files and directories are included in a particular volume, as specified by the user. In some examples, this collection of files and/or folders may be called a "data workspace" (or a "working space" in the example of FIG. 3).

First, a user may specify which files and directories the user wishes to make available to their containers that will run on the cluster. These files and directories may be stored on a variety of different data sources. The user can name and save this list, and the disclosed systems and methods may store the choices as a data workspace (or "working space"), which may be assigned a unique identifier (e.g., by identification module 104).

Additionally, the user can then give a command to the tool (e.g., automated driver 270) to create virtualization container volumes on the cluster. The driver may be used to create virtualization container volumes. These volumes could be located on all nodes of the cluster, or on a subset of nodes. The virtualization container volume driver may optionally take as an argument the unique identifier of the data workspace the user had requested, and the driver may use that identifier to look up what data belonged in the workspace, and where it was stored (e.g., identification module 104 may identify the multiple distinct storage locations shown within FIG. 4 in response to receiving a label, tag, name, or unique identifier for volume storage location 124). The driver, running on a node of the cluster, may then gain access to the data.

The driver may contain logic that can connect to a variety of data sources. For example, if a portion of the data lives on a network file system, the driver may take suitable steps to mount the network file system volume on the corresponding node. If another portion of the data is stored in SWIFT, the driver may access the data via SWIFT's REST API, as further discussed above.

Lastly, the driver may optionally expose the files and folders in the data workspace in a virtual, pass-through manner. For example, when asked to list the contents of the volume or a subdirectory of the volume, the driver may look at the list of files and directories in the data workspace. The driver may return any files, and in the case of directories, the driver may check the directory's backing data source (e.g., an object store, HDFS, etc.) for the contents of that directory. After the driver collects the requested information, the driver may return it to the user/caller. Accordingly, the files and folders may appear as if they were already simply sitting inside the virtualization container volume (e.g., a DOCKER volume).

A similar process may happen when the driver receives a read or write request. The driver may translate the request to a read or write on the backing storage (e.g., the multiple distinct storage locations shown in FIG. 4 and mapped to volume storage location 124), and then return the result to the caller. Within this logic, the driver can also optionally implement security, or user role permissions, by excluding files or blocking writes to files/directories that a particular user is not allowed access to, according to a security policy. The user may optionally connect to these virtualization container volumes using parameterized container deployments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for performing storage location virtualization, at least a portion of the method being performed by a computing device comprising at least one processor, the method comprising:
   identifying a volume storage location for an operating-system-level virtualization container that isolates an instance of user space, the volume storage location providing a working space for data accessed during the existence of the operating-system-level virtualization container;
   mapping, through an automated driver that performs location virtualization, the volume storage location to multiple distinct source locations outside of the operating-system-level virtualization container, rather than a single source location, such that contents from the multiple distinct source locations appear within the volume storage location as a combined single location for the contents; and
   propagating, through the automated driver, changes to the data within the working space of the volume storage location during the existence of the operating-system-level virtualization container to the respective multiple distinct source locations outside of the operating-system-level virtualization container to preserve the changes,
   wherein identifying the volume storage location enables usage of the volume storage location to be repeatable such that a user can provide access to the volume storage location from within a different operating-system-level virtualization container without the user repeatedly identifying the multiple distinct source locations.

2. The computer-implemented method of claim 1, wherein:
   the operating-system-level virtualization container operates in a cluster environment; and
   the automated driver provides access to the volume storage location to multiple operating-system-level virtualization containers on distinct nodes across the cluster environment.

3. The computer-implemented method of claim 2, wherein the automated driver further virtualizes the volume storage location within the cluster environment such that the volume storage location is available to each node of the cluster environment regardless of which node issues an access request to the volume storage location.

4. The computer-implemented method of claim 1, wherein identifying the volume storage location comprises:
   receiving a name for the volume storage location; and
   saving the name for the volume storage location to enable repeated reference to the volume storage location.

5. The computer-implemented method of claim 1, wherein:
   a file within one of the multiple distinct source locations is categorized as sensitive; and
   the automated driver blocks access, from the operating-system-level virtualization container, to the file.

6. The computer-implemented method of claim 1, wherein mapping, through the automated driver that performs location virtualization, the volume storage location to multiple distinct source locations outside of the operating-system-level virtualization container comprises initially receiving a selection from a user of the multiple distinct source locations as sources for the volume storage location.

7. The computer-implemented method of claim 1, wherein:
one of the multiple distinct source locations outside of the operating-system-level virtualization container comprises a mountable network file system; and
the automated driver is configured to mount the mountable network file system to propagate at least one of the changes to the data within the working space of the volume storage location during the existence of the operating-system-level virtualization container to the mountable network file system.

8. The computer-implemented method of claim 1, wherein:
one of the multiple distinct source locations outside of the operating-system-level virtualization container comprises a scalable redundant storage system instance; and
the automated driver is configured to access the scalable redundant storage system instance through a corresponding application programming interface.

9. The computer-implemented method of claim 1, wherein instead of repeating a process of manually selecting the multiple distinct source locations, the user is enabled to reference an identifier that was previously assigned to the volume storage location.

10. The computer-implemented method of claim 1, wherein the automated driver operates at a kernel level of a corresponding operating system.

11. A system for performing storage location virtualization, the system comprising:
an identification module, stored in memory, that identifies a volume storage location for an operating-system-level virtualization container that isolates an instance of user space, the volume storage location providing a working space for data accessed during the existence of the operating-system-level virtualization container;
a mapping module, stored in memory, that maps, through an automated driver that performs location virtualization, the volume storage location to multiple distinct source locations outside of the operating-system-level virtualization container, rather than a single source location, such that contents from the multiple distinct source locations appear within the volume storage location as a combined single location for the contents;
a propagation module, stored in memory, that propagates, through the automated driver, changes to the data within the working space of the volume storage location during the existence of the operating-system-level virtualization container to the respective multiple distinct source locations outside of the operating-system-level virtualization container to preserve the changes; and
at least one physical processor configured to execute the identification module, the mapping module, and the propagation module,
wherein the identification module identifying the volume storage location enables usage of the volume storage location to be repeatable such that a user can provide access to the volume storage location from within a different operating-system-level virtualization container without the user repeatedly identifying the multiple distinct source locations.

12. The system of claim 11, wherein:
the operating-system-level virtualization container operates in a cluster environment; and
the automated driver provides access to the volume storage location to multiple operating-system-level virtualization containers on distinct nodes across the cluster environment.

13. The system of claim 12, wherein the automated driver further virtualizes the volume storage location within the cluster environment such that the volume storage location is available to each node of the cluster environment regardless of which node issues an access request to the volume storage location.

14. The system of claim 11, wherein the identification module identifies the volume storage location at least in part through:
receiving a name for the volume storage location; and
saving the name for the volume storage location to enable repeated reference to the volume storage location.

15. The system of claim 11, wherein:
a file within one of the multiple distinct source locations is categorized as sensitive; and
the automated driver blocks access, from the operating-system-level virtualization container, to the file.

16. The system of claim 11, wherein the mapping module maps, through the automated driver that performs location virtualization, the volume storage location to multiple distinct source locations outside of the operating-system-level virtualization container at least in part through initially receiving a selection from a user of the multiple distinct source locations as sources for the volume storage location.

17. The system of claim 11, wherein:
one of the multiple distinct source locations outside of the operating-system-level virtualization container comprises a mountable network file system; and
the automated driver is configured to mount the mountable network file system to propagate at least one of the changes to the data within the working space of the volume storage location during the existence of the operating-system-level virtualization container to the mountable network file system.

18. The system of claim 11, wherein:
one of the multiple distinct source locations outside of the operating-system-level virtualization container comprises a scalable redundant storage system instance; and
the automated driver is configured to access the scalable redundant storage system instance through a corresponding application programming interface.

19. The system of claim 11, wherein instead of repeating a process of manually selecting the multiple distinct source locations, the user is enabled to reference an identifier that was previously assigned to the volume storage location.

20. A non-transitory computer-readable medium comprising one or more computer-readable instructions that, when executed by at least one processor of a computing device, cause the computing device to:
identify a volume storage location for an operating-system-level virtualization container that isolates an instance of user space, the volume storage location providing a working space for data accessed during the existence of the operating-system-level virtualization container;
map, through an automated driver that performs location virtualization, the volume storage location to multiple distinct source locations outside of the operating-system-level virtualization container, rather than a single source location, such that contents from the multiple distinct source locations appear within the volume storage location as a combined single location for the contents; and propagate, through the automated driver, changes to the data within the working space of the volume storage location during the existence of the operating-system-level virtualization container to the respective multiple distinct source locations outside of the operating-system-level virtualization container to preserve the changes, wherein identifying the volume storage location enables usage of the volume storage location to be repeatable such that a user can provide access to the volume storage location from within a different operating-system-level virtualization container without the user repeatedly identifying the multiple distinct source locations.

* * * * *